(12) United States Patent
Hedlund et al.

(10) Patent No.: US 10,319,488 B2
(45) Date of Patent: Jun. 11, 2019

(54) CONDUCTOR FOR A POWER TRANSMISSION CABLE AND A PROCESS FOR THE PRODUCTION OF THE CONDUCTOR

(71) Applicant: NKT HV Cables GmbH, Baden (CH)

(72) Inventors: Johan Hedlund, Karlskrona (SE); Igor Lacic, Karlskrona (SE)

(73) Assignee: NKT HV Cables GmbH, Baden (CH)

( * ) Notice: Subject to any disclaimer, the term of this patent is extended or adjusted under 35 U.S.C. 154(b) by 0 days.

(21) Appl. No.: 15/753,729

(22) PCT Filed: Aug. 19, 2015

(86) PCT No.: PCT/EP2015/068985
§ 371 (c)(1),
(2) Date: Feb. 20, 2018

(87) PCT Pub. No.: WO2017/028910
PCT Pub. Date: Feb. 23, 2017

(65) Prior Publication Data
US 2018/0247723 A1    Aug. 30, 2018

(51) Int. Cl.
*C22C 21/00* (2006.01)
*C22C 21/02* (2006.01)
(Continued)

(52) U.S. Cl.
CPC .......... *H01B 1/023* (2013.01); *B23K 35/288* (2013.01); *C22C 21/00* (2013.01); *C22C 21/02* (2013.01);
(Continued)

(58) Field of Classification Search
CPC ........ H01B 1/023; H01B 5/104; H01B 9/006; H01B 13/0036; B23K 35/288; C22C 21/02
(Continued)

(56) References Cited

U.S. PATENT DOCUMENTS 2,955,935 A * 10/1960 Horrigan ................. C22C 21/00
420/552
3,059,093 A    10/1962 Norcross et al.
(Continued)

FOREIGN PATENT DOCUMENTS

EP    0539670 A2    5/1993
EP    0785043 A1    7/1997
(Continued)

OTHER PUBLICATIONS

Aircraft Materials Dec. 9, 2004 https://www.aircraftmaterials.com/data/alu min iu m/1350. htm l (Year: 2004).*
(Continued)

*Primary Examiner* — Andargie M Aychillhum
*Assistant Examiner* — Michael F McAllister
(74) *Attorney, Agent, or Firm* — Whitmyer IP Group LLC

(57) ABSTRACT

A conductor for a power transmission cable including at least two separate lengths of conductors, having at least 99.5% by weight aluminum, and the remainder other metals or substances except a titanium content of at most 0.02% by weight. The at least two lengths of aluminum conductors joined together by a weld. The welding material alloy has an aluminum content of at least 85.2% by weight, a silicon content of from 4.0 to 13.0% by weight and the remainder up to 100% by weight and at most 1.8% by weight, other metals and/or substances; or an aluminum content of at least 99.5% by weight, a titanium content of from 0.10 to 0.50% by weight and the remainder up to 100% by weight, other metals and/or substances.

25 Claims, 8 Drawing Sheets

(51) Int. Cl.
   *H01B 1/02* (2006.01)
   *B23K 35/28* (2006.01)
   *H01B 9/00* (2006.01)
   *H01B 13/00* (2006.01)

(52) U.S. Cl.
   CPC ......... *H01B 9/006* (2013.01); *H01B 13/0036* (2013.01)

(58) Field of Classification Search
   USPC ....................................................... 174/126.3
   See application file for complete search history.

(56) References Cited

U.S. PATENT DOCUMENTS

| | | | |
|---|---|---|---|
| 3,634,649 A | 1/1972 | Rager et al. | |
| 3,647,565 A | 3/1972 | Schroemer | |
| 3,667,119 A * | 6/1972 | Cleaver | H01R 4/029 134/21 |
| 3,934,786 A * | 1/1976 | Kozak | B23K 9/038 228/138 |
| 5,391,854 A | 2/1995 | Namba et al. | |
| 7,189,941 B2 * | 3/2007 | Miklos | B23K 9/232 219/137 WM |
| 9,048,005 B2 * | 6/2015 | Holloway | H01B 1/023 |
| 9,099,218 B2 * | 8/2015 | Ishibashi | C22C 21/00 |
| 9,770,788 B2 * | 9/2017 | Anderson | B23K 35/383 |
| 2010/0038112 A1 * | 2/2010 | Grether | D07B 1/02 174/128.1 |
| 2011/0194973 A1 * | 8/2011 | Anderson | B23K 35/0227 420/534 |
| 2015/0104641 A1 * | 4/2015 | Mhetar | H01B 1/023 428/366 |
| 2015/0132181 A1 * | 5/2015 | Anderson | B23K 35/288 420/532 |
| 2015/0321294 A1 * | 11/2015 | Anderson | C22C 21/00 420/531 |
| 2015/0368496 A1 * | 12/2015 | Hawig | H01B 1/023 174/110 SR |
| 2018/0211746 A1 * | 7/2018 | Ranganathan | H01B 3/10 |

FOREIGN PATENT DOCUMENTS

| | | |
|---|---|---|
| FR | 2314260 A1 | 1/1977 |
| JP | H09316585 A | 12/1997 |
| JP | 2012022820 A | 2/2012 |

OTHER PUBLICATIONS

Aluminum Filler Alloy Selection Chart AlcoTec (Year: 2015).*
ESAB Knowledge Center Feb. 1, 2015 (Year: 2015).*
ESAB Product Data Sheet OK Tigrod 4043 (Year: 2008).*
Lincoln Electric Aluminum: Experience in Application (Year: 2011).*
International Preliminary Report on Patentability Application No. PCT/EP2015/068985 Completed Date: Jul. 6, 2017 6 pages.
International Search Report & Written Opinion of the International Searching Authority Application No. PCT/EP2015/068985 Completed Date: May 3, 2016; dated May 12, 2016 15 pages.
Worzyk, Thomas: "Submarine Power Cables", 2009 Springer-Verlag Berlin Heidelberg. , ISBN: 978-3-642-01269-3 p. 126.

* cited by examiner

CONDUCTOR FOR A POWER TRANSMISSION CABLE AND A PROCESS FOR THE PRODUCTION OF THE CONDUCTOR

TECHNICAL FIELD

The present invention relates to a conductor for a power transmission cable and to a process for the production of the conductor as defined in the appended claims.

BACKGROUND

High voltage electric power cables or power transmission cables are used to transmit electric power with medium or high voltage. The cables comprise a conductor and an insulation system that surrounds the conductor. Electric power cables that can be buried into the ground are called land cables. Electric power cables that can be buried into a sea bed which can freely extend between two fixing points in sea water are called submarine, sea water or underwater power cables. Underwater power cables are used today in an increasing amount due to the increased need of power transfer from for example offshore energy sources, including offshore renewable energy plants, such as wind power plants. Also the length for power transfer cables is increasing since there is a need to interconnect different regional electrical transmission networks to allow global trading of energy. Areas where energy is on the other hand needed and on the other hand produced may also be remote from each other which further increase a need for safe power transfer.

Aluminium conductors have been found to be suitable alternatives to traditional copper conductors in electric power cables, also called power transmission cables. Aluminium conductors are suitable for high voltage DC (HVDC)-cables, which are adapted to voltages of 50 kV or more. Long power transmission cables are produced by first joining short lengths or portions of conductors together to obtain a desired final length. The joints should not negatively affect the electrical and mechanical properties of the conductor. An insulation system and protective layers are subsequently applied onto the conductor to provide a power transmission cable.

There have been attempts to improve joints between the conductor portions. JP2012022820 describes a prior art method for providing a flexible joint for stranded conductors by welding a joint at each concentrically twisted layer and by welding the entire conductor element wires. However, materials for welding are not discussed in the document. Thus, despite known technologies, cost-effective and simple joining methods and materials are still needed.

Further in the prior art solutions the welding material, i.e. the welding metal rod or wire that melts during welding, has been similar material as in the conductor. This has been advantageous since the electrical properties of the cable have not been negatively affected by the joints. However, when using the same material as both welding material and the conductor material the welding process and the weld or joint obtained will become very sensitive. Sensitive welds or joints are a problem especially in underwater power cables, since the power cables are subjected to substantial external forces in the sea bed. Also, sensitive joints may brittle or even brake already before laying when the cable or conductor is coiled in storage coils. The coil diameter during coiling needs to be as small as possible and thus the cables or conductors are subjected to substantial bending forces which may break the joints. Therefore, there is a great desire to improve the mechanical strength of joints between conductor portions to provide stable and robust conductors.

SUMMARY

It is an object of the present invention to provide a conductor for a power transmission cable and a process for the production of the conductor that minimizes the above-mentioned problems with the prior art welded and jointed aluminium conductors especially with regard to sensitive conductor joints. Thus, it is an object to increase the mechanical strength of the jointed aluminium conductors while the electrical and/or thermal properties of the conductor are not substantially negatively affected.

It is a further object of the present invention to increase the robustness and quality of aluminium conductors.

It is a still further object to improve the coilability of power cables into coils with reduced diameter.

It is also an object of the present invention to provide a flexible process for the production of long aluminium conductors.

According to the present invention the objects above are attained by the present conductor for a power transmission cable as defined in the appended claims.

The objects above are attained by a conductor for a power transmission cable, or in other words a power transmission cable conductor, comprising at least two separate lengths of aluminium conductors. The aluminium content of the lengths of aluminium conductors is at least 99.5% by weight and the remainder up to 100% by weight comprises other metals or substances. By "at least 99.5%" by weight is meant a content that is higher than and including 99.5%, based on the total weight of the lengths of the aluminium conductors. By "remainder" is meant the balance up to 100% by weight, based on the total weight of the lengths of the aluminium conductors. The titanium content of the lengths of the aluminium conductor is at most 0.02% by weight, based on the total weight of the aluminium conductors, i.e. the maximum content may be 0.02% by weight.

The at least two lengths of conductors are joined together by means of a welded joint comprising a welding material alloy. The welding material alloy has an aluminium content of at least 85.2% by weight, a silicon content of from 4.0 to 13.0% by weight and the remainder up to 100% by weight and at most 1.8% by weight, based on the total weight of the welding material alloy, comprises other metals and/or substances. The weight-% are based on the total weight of the welding material alloy.

Alternatively, the welding material alloy has an aluminium content of at least 99.5% by weight, a titanium content of 0.10 to 0.50% by weight and the remainder up to 100% by weight, based on the total weight of the welding material alloy, comprises other metals, and/or substances. The weight-% are based on the total weight of the welding material alloy.

Further, in the welding material alloy the silicon or the titanium has been added to the welding material alloy to obtain the desired silicon or titanium content. For example, aluminium alloys of conductor may naturally comprise a minor amount of titanium, usually maximum of 0.02% by weight, but according to the present invention, the titanium content has been increased by actively adding titanium to the desired content of 0.10 to 0.50% by weight. Similarly, the silicon content has been increased by adding silicon to the desired content of from 4.0 to 13.0% by weight.

It has been surprisingly noted that the added silicon or titanium in the claimed contents significantly improves the mechanical properties of jointed aluminium conductors. Also, it has been surprisingly noted that the aluminium content in the welding material alloy can be lowered if silicon is incorporated in the alloy in the claimed content of from 4-13% by weight. Further, it has been surprising that the welding material alloy can have a different chemical composition than the aluminium conductor, which is advantageous, since the silicon and/or titanium can positively affect the mechanical properties of the conductor joints while the electrical and thermal properties are not substantially affected. By different chemical composition is meant that the chemical composition, for example the content of metals, such as titanium, is different in the aluminium alloy of the conductor and in the welding material alloy.

The present invention also relates to a power transmission cable comprising the conductor as described above, and as further described in the detailed description below. The cable normally comprises an insulation system that covers the conductor coaxially and radially outwards. Since the conductor has improved mechanical properties, also the power cable obtains improved mechanical properties and the advantages as mentioned above.

a. The objects above are also attained by a process for the production of a conductor for a power transmission cable as described above, comprising the steps of: providing at least two separate lengths of aluminium conductors for a power transmission cable, wherein the aluminium content of the lengths of aluminium conductors is at least 99.5% by weight and the remainder up to 100% by weight comprises other metals and/or substances and wherein a titanium content in the remainder is at most 0.02% by weight, based on the total weight of the lengths of the conductors;

b. joining the lengths of the conductors together by means of welding, wherein welding is performed by using a welding material alloy having
  i. an aluminium content of at least 85.2% by weight, a silicon content of from 4.0 to 13.0% by weight and the remainder up to 100% by weight and at most 1.8% by weight, based on the total weight of the welding material alloy, comprises other metals and/or substances; or
  ii. an aluminium content of at least 99.5% by weight, a titanium content of from 0.10 to 0.50% by weight and the remainder up to 100% by weight, based on the total weight of the welding material alloy, comprises other metals and/or substances.

The present invention also relates to a process for the production of a power transmission cable as described above and as further described in the detailed description below. The process comprises the process steps above and a further step of application of an insulation system to cover the conductor radially outwards.

Further aspects and advantages will be now described in the below detailed description with reference to the appended drawings.

DETAILED DESCRIPTION

Figure 1:
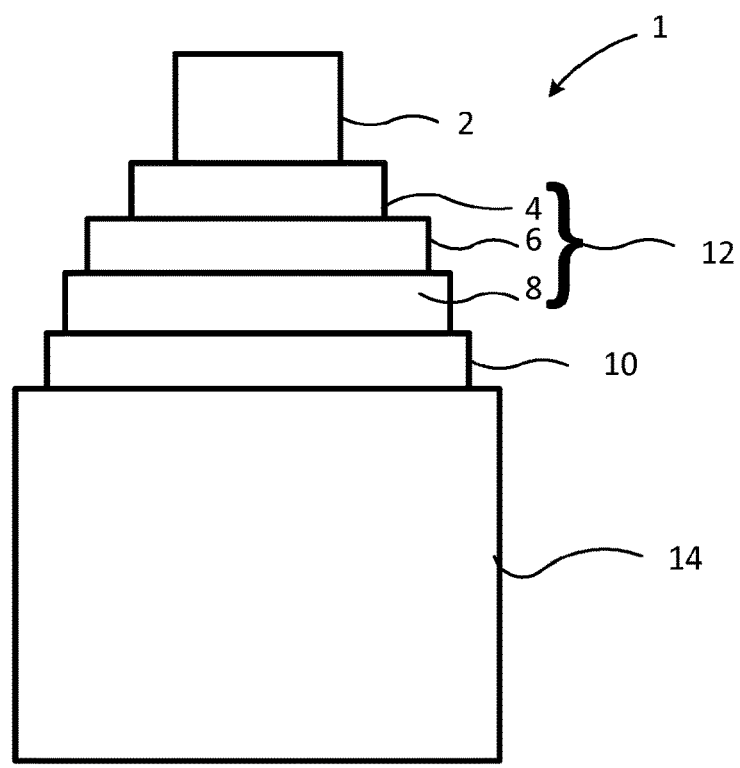
FIG. 1 is a partially cut side view of a power transmission cable comprising a conductor according to an embodiment of the present invention.

Power transmission cables or electric power cables are aimed for transmitting electric power. The demands with regard to electric and mechanical properties are increasing due to the increased demand for electricity and due to the long distances electricity needs to be transmitted as described in the background. The conductor according to the present invention is intended for direct current (DC) power cables, such as high voltage direct current (HVDC) cables, suitable for use as a land cables or a submarine cables.

As summarized above, the inventors of the present disclosure have surprisingly noted that by using a welding material comprising titanium or silicon in a higher content than in the conductor, it has been possible to improve the mechanical strength of the conductor weld while the electrical and/or thermal properties have not been substantially changed or negatively affected. Also, the process for the production of the power cable becomes more stable, since the welded joints are not so sensitive for mechanical forces. In this way it is possible to improve the joints between the cable lengths or portions, whereby cables can be installed in deeper water depths. Also, it is possible to coil the conductors or cables including the conductors into smaller diameters, which is a huge advantage since longer cable lengths can thus be transported and laid from a carrier vehicle, such as a ferry. Also, the weight of the cable can be essentially decreased compared to traditional copper cables whereby the transport of the cables to a place of utilization is easier and more environmentally friendly due to decreased fuel costs obtained by lighter load in carrier vehicles.

The welding materials are provided in the form of wires or rods and they melt together with the conductor material during welding and thus form a joint. It has been found that the welding material alloy having an aluminium (Al) content of at least 85.2% by weight and silicon (Si) content of from 4.0 to 13.0% by weight and in which the remainder up to 100% by weight and at most 1.8% by weight, based on the total weight of the welding material alloy, comprises other metals and/or substances, has a lower melting temperature than the alloy of the aluminium conductor having an aluminium content of at least 99.5%. The remainder in the welding material contains other metals and/or substances in a maximum amount of up to about 1.8% by weight, based on the total weight of the welding material alloy, since aluminium alloys naturally and usually contain a certain amount of other metals and/or substances as impurities. Thus, the weight-% of the aluminium alloy of the welding material can be calculated:

Weight-% Aluminium+Weight-% Silicon+Weight-% other metals and/or substance of max. 1.8%=100% by weight For example, if the welding material alloy has a silicon content of 11% by weight, it has an aluminium content of from 87.2-89% by weight, i.e. the maximum content of the other metals and/or substances in the remainder is from 0-1.8% by weight. Even though the aluminium alloy contains silicon, the electrical and/or thermal properties of the conductor are not substantially affected or deteriorated, which is unexpected especially since silicon is not a metal. By lowering the melting temperature, welding can be performed at a lower temperature whereby the aluminium conductor is affected minimally. Also, the alloy with silicon has very good mechanical properties. Thus, lower melting temperature leads to the conductor per se being minimally affected. Further, the mechanical properties of the welding material alloy comprising aluminium and silicon in the amount of from 4.0 to 13.0% by weight provides excellent mechanical properties for joints in aluminium conductors.

It has also been found that the welding material alloy having an aluminium content of at least 99.5% by weight and a titanium content of from 0.10 to 0.50% by weight and the remainder up to 100% by weight, based on the total weight of the welding material alloy, other metals and/or substances renders the joints between the conductor lengths excellent mechanical properties. The content of titanium should be kept at 0.5% by weight or below 0.5% by weight, since titanium may raise the melting temperature of the alloy. Therefore, there may be a risk that the aluminium conductor will be deteriorated during welding. However, the content of from 0.10 to 0.50% by weight has surprisingly been found to be suitable, whereby the mechanical properties of a jointed cable can be considerably improved.

The conductor may comprise several joints and the joints in the conductor may be of the same kind or the joints may be of a different kind. Thus, the conductor may contain one or more joints containing a welding material alloy having an aluminium content of at least 85.2% by weight, a silicon content of from 4.0 to 13.0% by weight and the remainder up to 100% by weight and at most 1.8% by weight, based on the total weight of the welding material alloy, comprising other metals and/or substances and one or more joints containing a welding material alloy having an aluminium content of at least 99.5% by weight, a titanium content of 0.10 to 0.50% by weight and the remainder up to 100% by weight comprising other metals and/or substances. The joints containing the welding material alloy according to the invention improve the mechanical strength of the conductor.

Since the mechanical strength of the joints in the conductor can be improved it is possible to reduce the coil diameter of cables with aluminium conductors. This is possible since the cables tolerate bending better than the prior art cables. By reducing the coil diameter it is possible to store and transport longer conductor or cable lengths, whereby considerable economic savings and environmental advantages can be obtained. At the same time it is possible to increase the water depth the cable can be installed in since the cables tolerate forces in the sea bed better than prior art solutions, which increases the competitiveness.

According to one embodiment of the invention, the welding material alloy has an aluminium content of at least 99.5% by weight, a titanium content of 0.10 to 0.20% by weight and the remainder up to 100% by weight comprises other metals and/or substances. This welding material alloy provides for excellent joints and very good electrical properties.

According to another embodiment of the invention the welding material alloy has an aluminium content of at least 85.2% by weight, and a silicon content of from about 11.0 to 13.0% by weight and the remainder up to 100% by weight and at most 1.8% by weight, based on the total weight of the welding material alloy, comprises other metals or substances. Thus, the remainder contains other metals and/or substances in a maximum amount of about 1.8% by weight. Likewise as above, this welding material alloy provides for excellent joints and very good electrical properties.

It has also been found that the welding material alloy may have an aluminium content of at least 92.3% by weight, and a silicon content of from 4.5 to 6.0% by weight and the remainder up to 100% by weight comprises other metals and/or substances. The remainder contains other metals and substances in a maximum amount of about 1.7% by weight. Also this lower silicon content has a positive effect on the mechanical properties of the conductor while the electrical and/or thermal properties of the conductor are kept in a satisfactory level.

According to one variant of the invention, the aluminium conductor comprises at least 99.7% by weight aluminium and the remainder comprises other metals and/or substances. The purer the conductor material is, the better the electrical properties of the conductor are. However, minor amounts of other metals or substances are often unavoidable due to for example the origin of the raw material for aluminium.

The other metals or substances in the welding material alloy may comprise one or more of Si, Mn, V, Cu, Ti, Zn, Fe, Be and Mg.

The other metals or substances in the lengths of aluminium conductors may comprise for example one or more of B, Cr, Cu, Fe, Ga, Mn, Si, V, Ti, Zn.

The welded joint can be a v-joint. V-joint is a type of a butt weld, i.e. a weld in which two lengths of metal conductors are joined in the same plane. V-joint has at least one bevelled edge, and normally two bevelled side edges, thus forming a V-profile for the joint. The V-joint may be a single V-joint or a double V-joint. The V-joint provides mechanically strong joints that are easy to process while minimum amount of welding material can be used. Thereby the weld affects minimally the electrical properties of the conductor. Other types of welding joints known in the art can of course be used.

The lengths of the conductors may have a structure of a stranded conductor, a solid conductor, a profile wire conductor or combinations thereof. The weld can be made between any type of aluminium conductor structure and the conductor structures can be of the same or different kind. Thus, the lengths of the conductor may be same or different kind and can be joined by means of the welding material according to the invention such that conductors with improved mechanical properties are provided. Stranded conductors comprise a plurality of aluminium strands bundled together. Stranded conductors render the conductors flexible and easy to handle. The conductor may also be solid, whereby a robust structure is obtained. A further structure for conductor is a profile wire conductor, which have a specific cross-section shape. The conductor structures can be of the same or different kind.

The length of each of the separate lengths of conductors can be from a few meters to tens of meters and up to thousands of meters. When the separate lengths of conductors are joined together, conductors having a desired total length may be provided.

The invention also relates to a process for the production of a conductor for a power transmission cable as described above, and comprises the steps of:
a. providing at least two separate lengths of aluminium conductors for a power transmission cable, wherein the aluminium content of the lengths of aluminium conductors is at least 99.5% by weight and the remainder up to 100% by weight comprises other metals and/or substances and wherein a titanium content in the remainder is at most 0.02% by weight, based on the total weight of the lengths of the conductors;
b. joining the lengths of the conductors together by means of welding, wherein welding is performed by using a welding material alloy having
   i. an aluminium content of at least 85.2% by weight, a silicon content of from 4.0 to 13.0% by weight and the remainder up to 100% by weight and at most 1.8% by weight, based on the total weight of the welding material alloy, comprises other metals and/or substances; or
   ii. an aluminium content of at least 99.5% by weight, a titanium content of from 0.10 to 0.50% by weight and the remainder up to 100% by weight, based on the total weight of the welding material alloy, comprises other metals and/or substances.

The welding joint obtained may be a v-joint. The joint may be achieved by means of any suitable welding technology, such as gas metal arc welding (GMAW), e.g. metal inert gas (MIG) welding or gas tungsten arc welding (GTAW), also known as tungsten inert gas arc (TIG) welding. These welding technologies are commonly known in the technical field and can be used in connection with power cable conductors. Also, such welding technologies may be used at a place of laying of the cable, for example on board of a transport vehicle. To produce a power transmission cable, the process steps above may further comprise a step of applying an insulation system to cover the conductor radially outwards.

In a power transmission cable, the conductor is normally surrounded by an electric insulation system. The insulation system may be based on polymeric materials, such as olefin-based materials, especially high-density polyethylene-based materials. The insulation system may also comprise paper-based materials. The insulation system may comprise a first, inner, semi-conducting layer, insulation layer and a second, outer, semi-conducting layer. An insulation layer is thus located between the semi-conducting layers. The power transmission cables may be underwater or submarine power cables or the cables may be land cables. The cables are preferably power transmission cables having a rated voltage of 50 kV or higher, and are thus suitable for use as a high voltage transmission power cable. Suitably, the electric power cable is a submarine cable.

An example of a cable design in which the conductor according to the present invention can be incorporated is further described with reference to the appended drawings.

Figure 2:
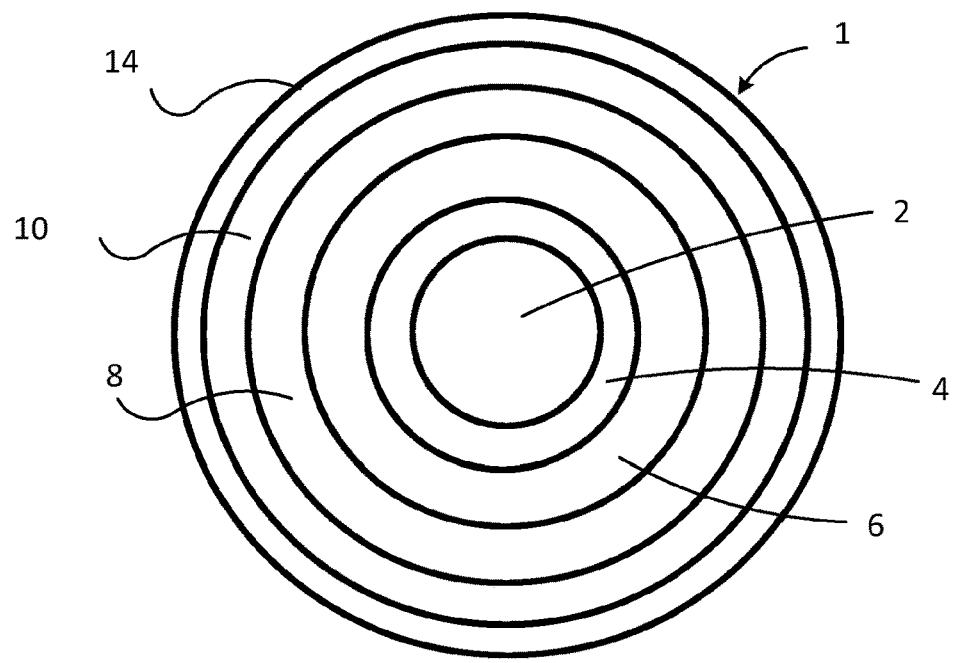
FIG. 2 is a cross-section of a power transmission cable illustrated in FIG. 1.

FIG. 1 is a partially cut side view of an electric cable 1 according to the present invention, and FIG. 2 shows a radial cross section thereof. The cable 1 comprises a conductor 2, a first semi-conducting layer 4 radially innermost and closest to the conductor 2, insulation layer 6 radially surrounding and in contact with the first semi-conducting layer 4 and a second semi-conducting layer 8 radially outermost from the conductor and in contact with the insulation layer. The first semi-conducting layer 4, the insulation layer 6 and the second semi-conducting layer 8 together form an insulation system 12 (shown only in FIG. 1) for the power transmission cable 1. There may be more than one insulation layer and there may be more than one semi-conducting layer in the insulation system, such as 1-4 insulation layers and 1-4 semi-conducting layers. The power transmission cable 1 in FIGS. 1 and 2 is surrounded by an outer protective system 10, which may contain moisture barriers and protective layers providing protection against outer mechanical forces. The cable also comprises an outer shield 14, which provides mechanical protection for the cable.

Figure 3:
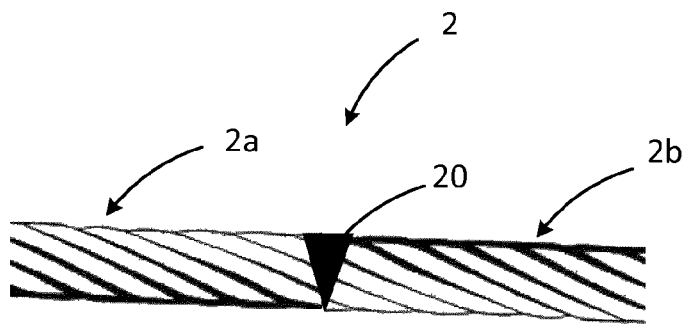
FIG. 3 is a side view of a conductor comprising two lengths of stranded conductors.

FIG. 3 shows a side view of a conductor 2 comprising a first length of a conductor (2a) and a second length of a conductor (2b) joined together by means of a V-joint 20. The conductor 2 is stranded.

The insulation system may comprise paper-based insulation materials, semi-conductive and insulation layers, or polymeric insulation materials.

The effects of the present conductor joints are now also further illustrated in the appended Example below. The examples should not be regarded as limiting the scope of the invention, but are presented to illustrate the effects of the invention.

EXAMPLES

Materials

Tensile and bending tests were performed on reference test objects (from hereon in labelled "REF") and inventive test objects (from hereon in labelled "INV"). Each test object comprised sections of 2590 mm$^2$ cross-section stranded aluminium conductor joined together in sequence with six V-shaped joints. Each stranded aluminium conductor length comprised 115 aluminium strands having a diameter of 5.8 mm before the strands were compressed. In the compression the strands were drawn and flattened such that a stable stranded conductor structure was provided. Compression in different layers varied from 4.2-4.6%. Each stranded conductor, i.e. the "REF" and "INV" conductors were compressed in the same manner.

The material for the conductor was aluminium alloy and is depicted as EN AW-1350. The chemical composition is shown in Table 1 below. The joints were welded with TIG-welding and by using welding rod, i.e. welding material, having different chemical compositions and as outlined below in Table 1. The total length of each test object was at least 30 m and there was at least approximately 3 m of conductor between each test joint.

The welding material used in the joints of the reference test object (REF) had the same or higher purity as the aluminium material of the conductor and did not include any added titanium or silicon. The welding material is depicted as 1070. The reference test object comprised six reference test welded V-joints REF1-REF6.

The test object of the invention (from hereon in labelled "INV") comprised the same aluminium conductor material EN AW-1350 as the reference object and six inventive test welded V-joints INV1-INV6. The welding material used in INV1-INV3 was depicted 1450 and comprised 99.5% by weight aluminium and 0.1-0.2% by weight titanium. The welding material used in INV4-INV6 was depicted 4047 and comprised at least about 85.2% by weight aluminium and from 11-13% by weight silicon.

The chemical compositions of the test materials are shown in the table 1 below.

TABLE 1

% by weight; (max) is the maximum content and (min) the minimum content of each metal or substance; total always 100%

| | Conductor EN AW-1350 | Welding material REF1-REF6 (1070) | Welding material INV1-INV3 (1450) | Welding material INV4-INV6 (4047) | Welding material (4043) INV |
|---|---|---|---|---|---|
| Aluminium | 99.50 (min) | 99.70 (min) | 99.50 (min) | 85.2 (min) | 92.3 (min) |
| Si | 0.10 (max) | 0.20 (max) | 0.25 | 11.0-13.0 | 4.5-6.0 |
| Ti | V + Ti 0.02 (max) | 0.03 (max) | 0.10-0.20 | | 0.20 |
| Mn (max) | 0.01 | 0.03 | 0.05 | 0.15 | 0.05 |
| V (max) | | 0.05 | | | |
| Cu (max) | 0.05 | 0.04 | 0.05 | 0.30 | 0.30 |
| Zn (max) | 0.05 | 0.04 | 0.07 | 0.20 | 0.10 |
| Fe (max) | 0.40 | 0.25 | 0.40 | 0.8 | 0.8 |
| Be (max) | | 0.0003 | 0.0003 | 0.0003 | 0.0003 |
| Mg (max) | | 0.03 | 0.05 | 0.10 | 0.05 |
| B (max) | 0.05 | | | | |
| Cr (max) | 0.01 | | | | |
| Ga (max) | 0.03 | | | | |
| Others (max) | 0.10 | 0.03 | 0.03 | 0.15 | 0.15 |

Welding material 4043 is a material according to the invention but was not used in the tensile and bending tests.

Test Performance for Mechanical Strength

Figure 4:
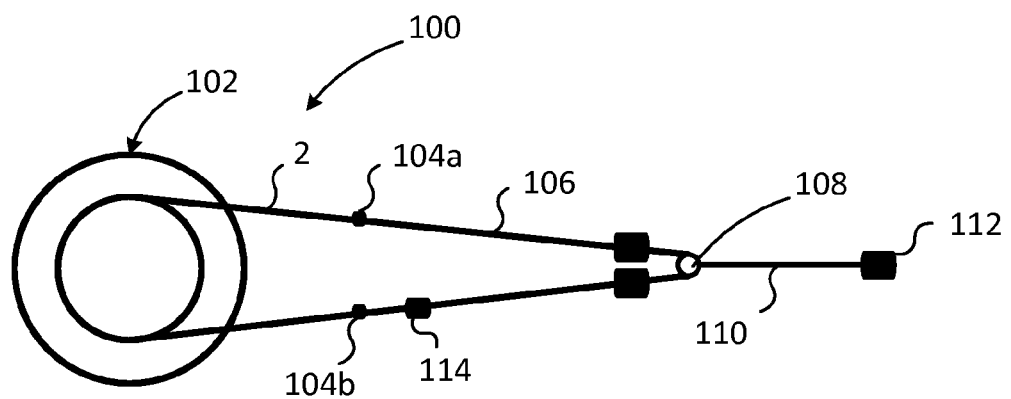
FIG. 4 is a schematic view of a test setup for measurements of tensile strength.
Figure 5A:
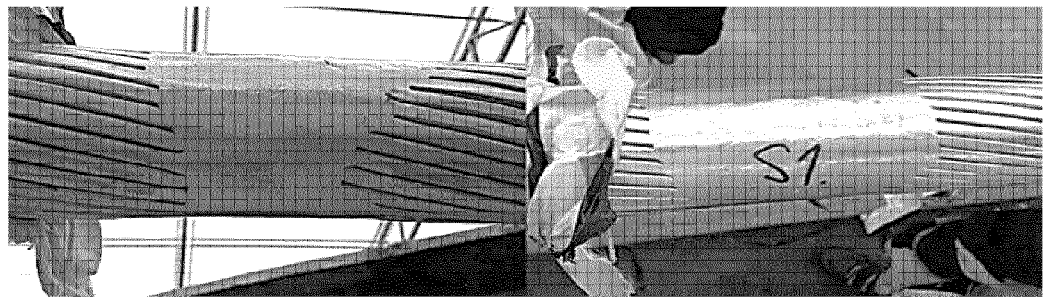
FIG. 5a-5f shows reference test joints REF1-REF6 after being subjected to the tensile and bending test at a tensile load of 78 kN.
Figure 5B:
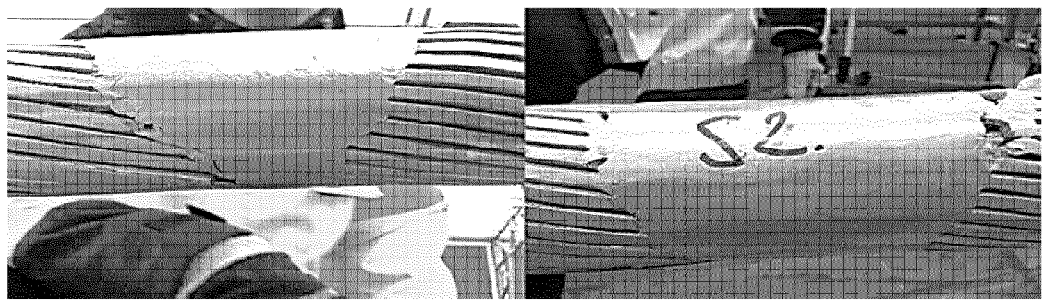
Figure 5C:
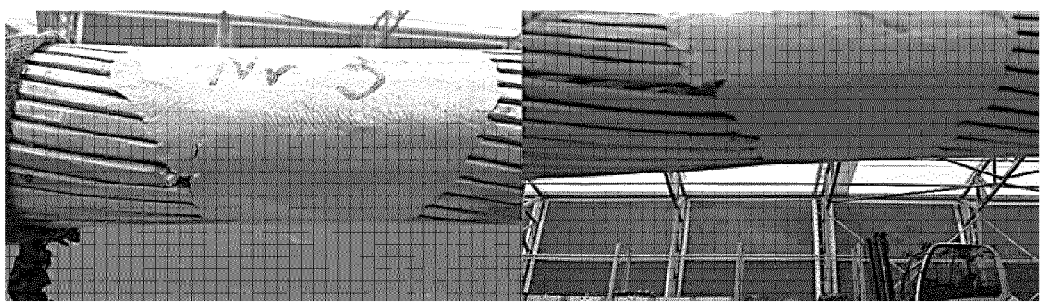
Figure 5D:
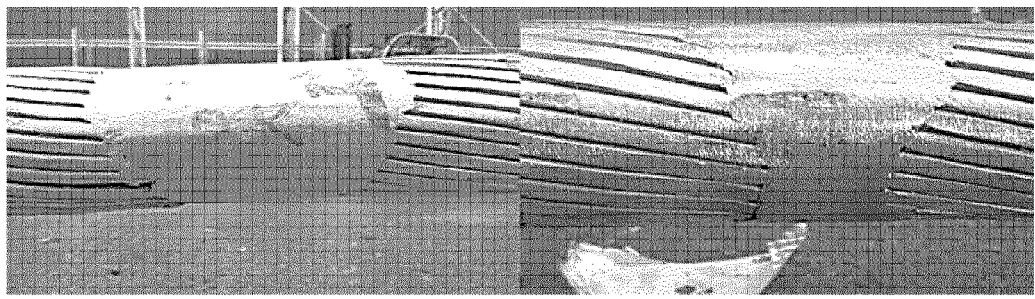
Figure 5E:
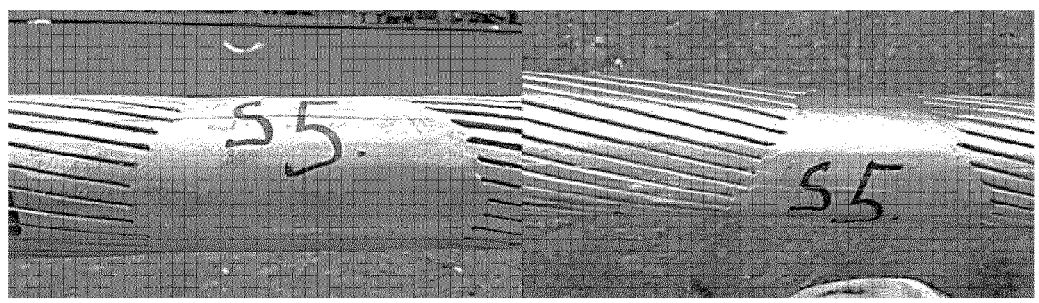
Figure 5F:
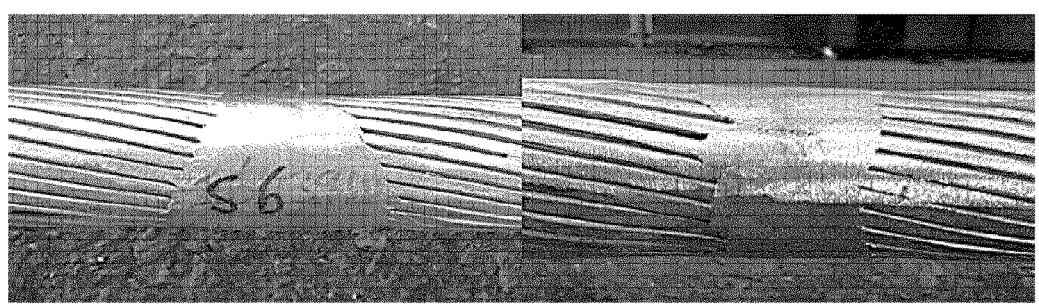

The test equipment 100 is shown in FIG. 4. The equipment comprises a pulling wheel 102, which is arranged to pull and rotate the conductor at a desired force. The conductor 2 is connected to a wire block 108 which in turn is connected to a pulling cylinder 112 via a second wire 110. Pulling socks 104a 104b are used to couple the test object (conductor) 2 and the wire 106. A force sensor 114 is located near the pulling socks 104a, 104b. The test object conductor 2 had a pulling sock 104a, 104b mounted on each end. A first wire 106 was affixed to each pulling sock 104a, 104b and the test object 2 was tensioned to a predetermined tensile level using the wires 106, 110 and the pulling cylinder 112. A force sensor 114 in proximity to the pulling socks 104a, 104b was used to measure the tensile force applied to the test object 2. The test object 2 was then bent around a 3 m diameter pulling wheel at the desired tensile level for up to six turns. After the completion of the first tensile level, each test welded joint was subjected to ocular inspection before proceeding to a next, higher tensile level. This test process was iterated using successively higher tension loads until breakage of one of the test welded joints. After breakage, all welded joints were subjected to a final inspection.

Results

The results of the tensile and bending tests for the reference test object (REF) is shown in Table 2. All joints were noticeably degraded after bending under a tensile load of 78 kN. FIGS. 5a-5f show each joint REF1-REF6, respectively, after bending at 78 kN tensile load. The maximum tensile load that could be applied under the test conditions was 90 kN, leading to the breakage of joint REF4.

TABLE 2

| Tensile Force/kN | Bendings | Observations |
|---|---|---|
| 39 | 6 | REF2 had cracks, possibly from manufacturing. |
| 65 | 6 | A little crack in REF1, REF2 had worsened; REF3 had cracks. |
| 71 | 6 | REF1 and REF2 had worsened. |
| 78 | 6 | Cracks in all joints (REF1-REF6), REF2 is cracked worst. |
| 90 | N/A | REF4 broke upon tensioning, prior to bendings. |

Figure 6A:
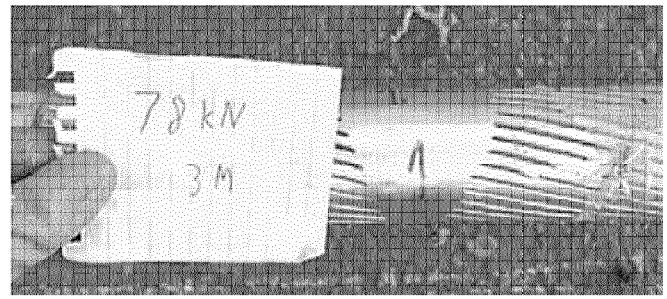
FIG. 6a-6f shows inventive test joints INV1-INV6 after being subjected to the tensile and bending test at a tensile load of 78 kN.
Figure 6B:
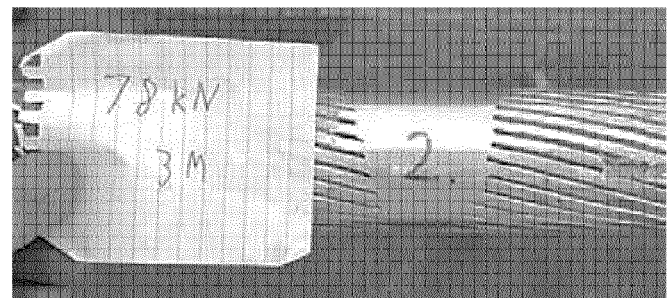
Figure 6C:
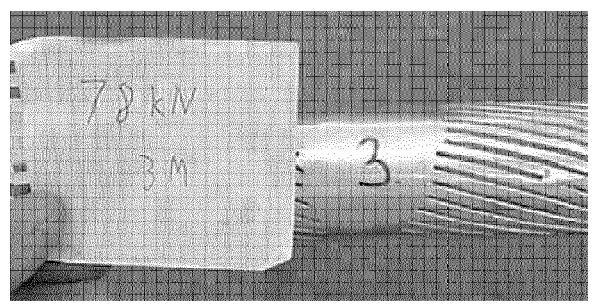
Figure 6D:
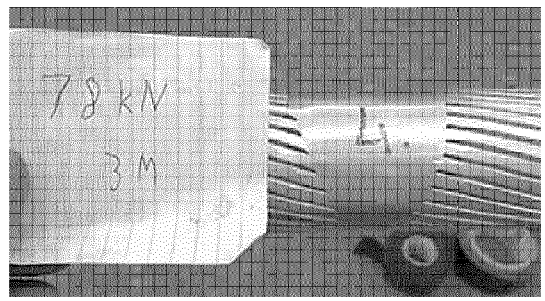
Figure 6E:
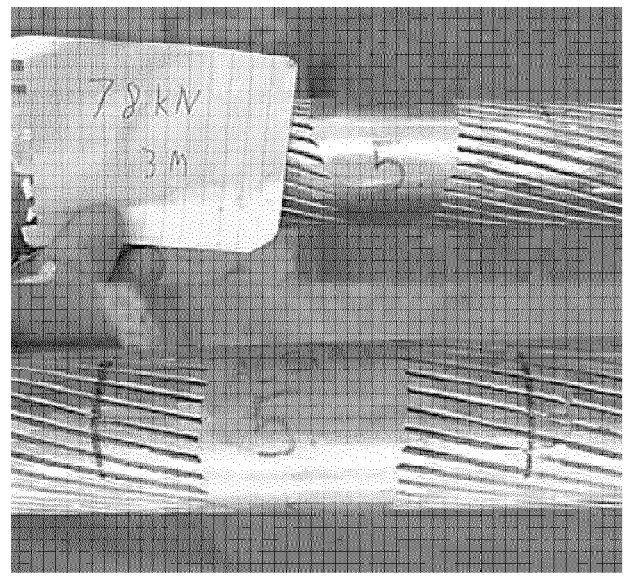
Figure 6F:
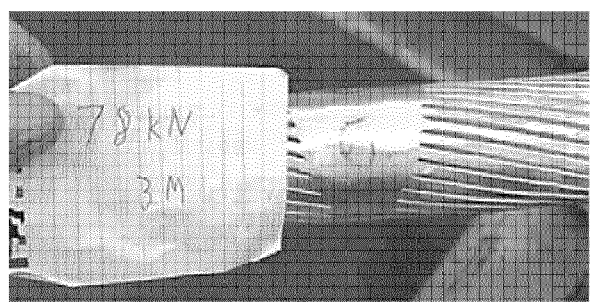

The results of the tensile and bending tests for the inventive test objects (INV) are shown in Table 3 and in FIG. 6a-6c for INV1-INV3 and FIG. 6d-6f for INV4-INV6 after bending at tensile loads of 78 kN. After bending at tensile load of 78 kN only one joint (INV2) was slightly cracked. Even after performing the bending test at loads as high as 117 kN, joints INV5 and INV6 remained uncracked. The maximum tensile load that could be applied under the test conditions was 129 kN, leading to the breakage of joint INV5.

TABLE 3

| Tensile Force/kN | Bendings | Observations |
|---|---|---|
| 65 | 3 | Joint INV5 had a mall crack from start. No cracks in the other joints. |
| 78 | 3 | INV2 cracked 2 mm in one wire. |
| 91 | 1 | No change. |
| 104 | 1 | INV5 has cracks in two wires. |
| 117 | 1 | INV1: small crack; INV2 two cracks; INV3: three wires cracked; INV4: dented. |
| 129 | ½ | INV5: failure at first turn; INV1 waist and small crack; INV2: waist and one 2 mm crack; INV3: two 2 mm cracks; INV4: waist and dent; INV6: waist |

Conclusion Mechanical Strength

It is demonstrated that the all welded joints of the invention display a superior performance in the tensile and bending tests as compared to reference welded joints using welding material 1070 that has similar properties as the conductor EN AW-1350. After testing at tensile loads of 78 kN all reference welded joints were noticeably cracked, whereas only one of the inventive welded joints had cracked at the same tension levels. The tensile load required for breakage of a joint under test conditions was 90 kN for the reference test object, as compared to 129 kN for the inventive test object.

Test Performance for Thermal Properties

In this test it was investigated how the inventive welding materials INV1-INV3 (1450) and INV4-INV6 (4047), which have a higher resistance than the cable conductor material, affect the thermal properties of the conductor. In order to investigate whether the increased resistance in the weld affects the generation of heat a numerical FE (Finita element) analysis was carried out in COMSOL in accordance with IEC 60287. The numerical analysis was basically performed as described below.

The conductor was the same as described above in connection with materials. The conductor had a 2590 mm² cross-section, and was a stranded aluminium conductor joined together in sequence with six V-shaped joints. This corresponds to resistance R=0.0147 Ω/km.

The resistance of the welding material alloys comprising added silicon or titanium is usually higher than the resistance of the conductor or the reference welding material 1070. The conductor comprising material depicted 1350 had a value 61.8% IACS. A further welding material specified as 4043 and has a silicon content of 4.5 to 6.0% and was also used in conductivity specification. The following conductivities were specified:

1450—61.8% IACS

4043—42% IACS

4047—41% IACS

An alloy 5356—29% IACS was used in the numerical analysis since it had the lowest conductivity, and all the inventive materials 1450, 4043 and 4047 had higher conductivity.

100% IACS=5,8*10^7 siemens/m

This corresponds to resistivity:

$$\rho = \frac{1}{0.29 \cdot 5.8 \cdot 10^7} = 5.9453 \cdot 10^{-8}$$

The conductor area is $$A = \frac{59.6^2}{4}\pi = 0.0028 \text{ m}^2.$$

The resistance for the alloy is thus $$R = \rho \frac{l}{A} = 5.9453 \cdot 10^{-8} \frac{1000}{0.0028} = 0.0213 \text{ }\Omega/\text{km}.$$

The following Comsol model (modelling software) was created to simulate the conductor joint and included the following parameters in which D depicts the diameter.

| | |
|---|---|
| Dcond | 59.6 mm |
| D (insulation) | 108.44 mm |
| D (lead) | 114.44 mm |
| Dpe (plastic layer) | 119.89 mm |
| D (armouring) | 128.89 mm |
| Dpp (polypropen garn layer) | 137.89 mm |
| Length | 10 m |
| Dist_jointcond (at the thinnest portion) | 10 mm |
| jointinclination | 80 deg |
| res_conductor | 0.0115 ohm/km |
| res_alloy | 0.0213 ohm/km |
| I | 1100 A |

The conductor was cut in the middle and the welding alloy was applied with a 10 mm distance between the closest points (thinnest welding portion) and at an angle of 80° according to the maximum allowed angle in joints. The energy losses in the conductor and in the welding alloy were counted according to the following equation:

$$W = I^2 \cdot R(1+0.00403(T-20))$$

Further in the COMSOL model it was evaluated that the cable was dug 5 m under the ground with a thermal resistivity of 1.6 K*W/m and a ground temperature of 20° C. to be able to obtain a conductor temperature of over 50° C.

Results

Figure 8:
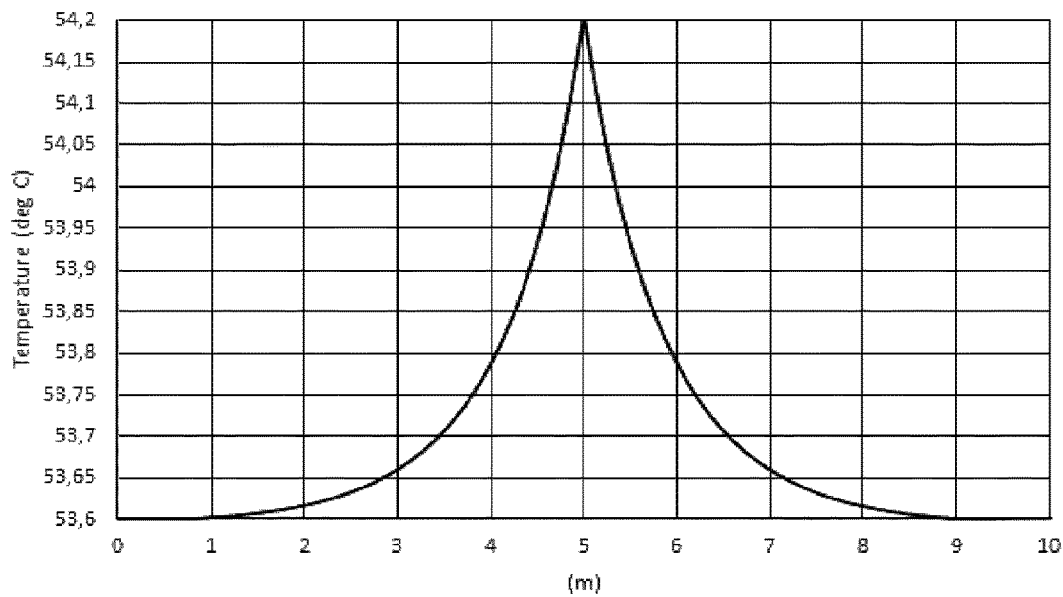
FIG. 8 shows theoretical temperature increase in the welding material alloy.

FIG. 8 shows the evaluated temperature profile of the conductor. It can be seen that there is a minor raise of the temperature of 0.6 K in the joint. Thus, it can be assumed that the welding materials according to the present invention do not substantially affect the thermal properties of the conductor negatively.

Thermal Tests

Figure 7:
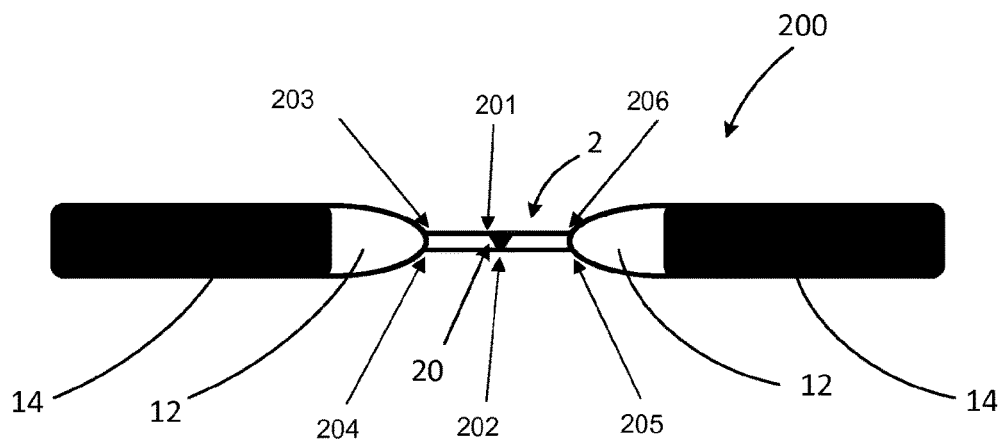
FIG. 7 is a schematic test setup for measurements of resistance by means of temperature measurements at different locations in the conductor.

To verify the FE analysis two flexible vulcanized joints were produced. The joints were produced in accordance with a test setup as schematically shown in FIG. 7. Further information on flexible vulcanized joints can be found for example from hand book "Worzyk, Thomas: Submarine power cables, ISBN 978-3-642-01269-3", page 126. The above-mentioned inventive welding alloys, 1450 and 4047 were used in the joints and tested with load cycling.

FIG. 7 shows schematically the test setup. Cable 200 comprises a conductor 2. Insulation system 12 and outer shield 14 with protective layers (not shown) were removed from the portion of the conductor 2 comprising a joint 20. Six temperature sensors 201, 202, 203, 204, 205 and 206 were fixed to the conductor 2 at different locations both to the left and to the right of the joint and also at the joint 20 as shown in FIG. 7.

After the sensors were fixed in the conductor, the cable was assembled in a circuit were DC-current was applied until the conductor reached a temperature of 70 C°.

Results

Figure 9:
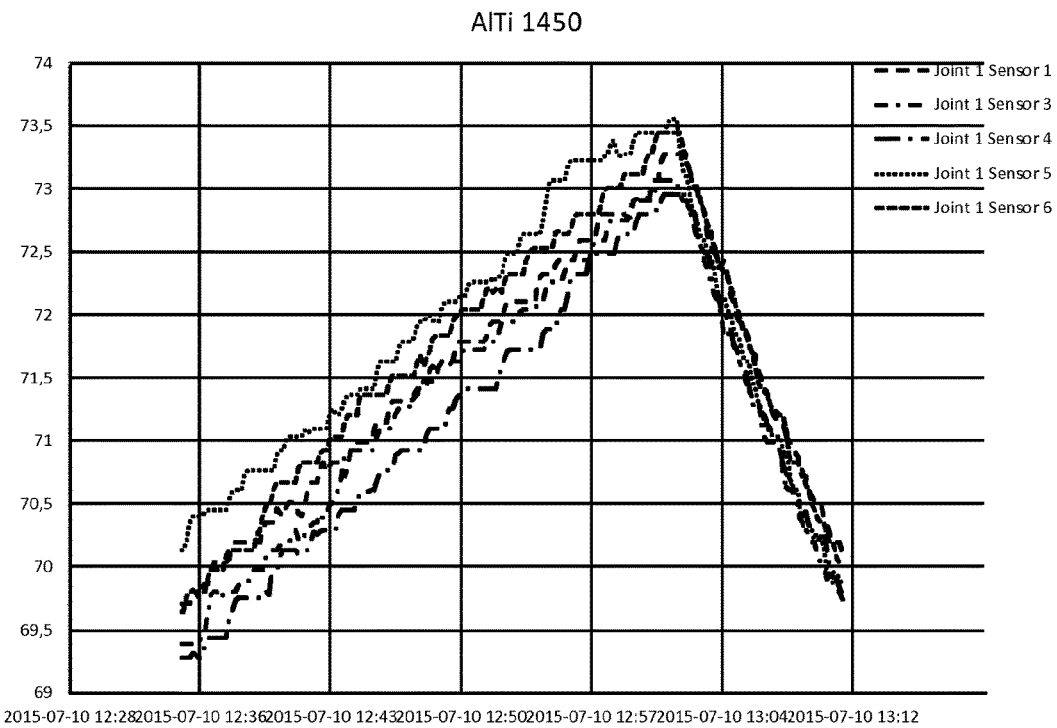
FIG. 9 shows test results for temperature measurements in a conductor comprising a joint welded with welding material alloy comprising aluminium and titanium according to the present invention.
Figure 10:
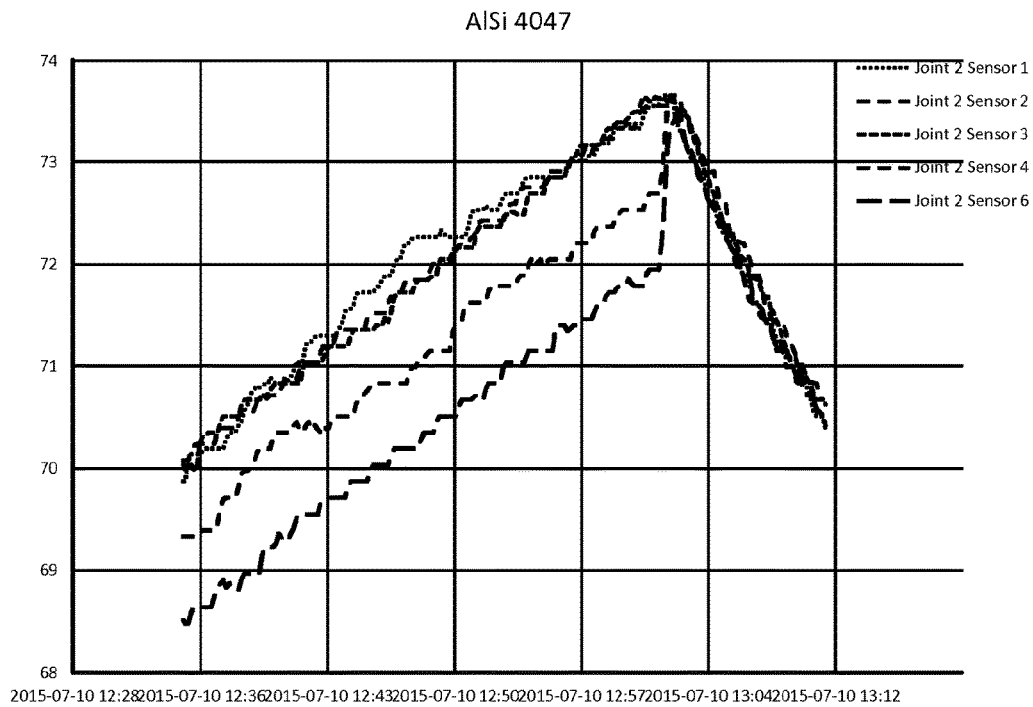
FIG. 10 shows test results for temperature measurements in a conductor comprising a joint welded with welding material alloy comprising aluminium and silicon according to the present invention.

FIGS. 9 and 10 display the temperature as a function of time for the two different joints comprising the two different welding materials 1450 and 4047, respectively. The thermal sensors had a measuring accuracy of 1-2 C°.

FIG. 9 shows the results for the alloy AlTi 1450, which contains at least 99.5% aluminium, between 0.1% to 0.2% titanium and rest products, all % referring to % by weight. From the conductivity measurements above it can be seen that the 1450 alloy has the same electrical performance as the 1350 conductor, and no temperature increase was expected. As can be seen from FIG. 9 there were only small temperature variations at different sensor positions. The deviations in temperature can be explained by the accuracy of the thermal sensors. Thus, the 1450 alloy does not substantially affect the electrical or the thermal properties of the conductor.

FIG. 10 shows the results for the alloy AlSi 4047, which contains between 11% to 13% silicon, at least 85.2% aluminium and rest products, all % referring to % by weight. This welding material alloy has a higher resistance than the 1350 conductor material, so a temperature increase in the range between 0.5 to 1 C° was expected. From the curves in FIG. 10 it can be seen that at the positions for sensor 1 and 2 (placed in proximity of joint), the measured temperature variations were among the largest, about 1.5 C°. However, it can be concluded that the temperature increase is within the expected 0.5 to 1 C°, since small deviations in the temperature measurements are caused due to the measuring inaccuracy of the thermal sensors. Thus, the 4047 alloy does not affect negatively the electrical or the thermal properties of the conductor.

Since 4043 alloy had nearly the same conductivity as 4047 alloy, it can be concluded that 4043 alloy having a lower silicon content of 4.5 to 6.0% by weight than 4047 alloy would not substantially affect the thermal properties of the conductor. Thus also 4043 alloy is suitable for use as a welding material in aluminium conductors.

The invention may be varied within the scope of the appended claims.

The invention claimed is:

1. A conductor for a power transmission cable comprising:
  at least two separate lengths of aluminium conductors, wherein the aluminium content of the lengths of the aluminium conductors is at least 99.5% by weight, and the remainder up to 100% by weight includes other metals and/or substances, and wherein a titanium content in the remainder is at most 0.02% by weight, based on the total weight of the lengths of the aluminum conductors,
  the at least two lengths of the aluminium conductors being joined together by means of a metal inert gas welded or tungsten inert gas welded joint including a welding material alloy, wherein the welding material alloy has an aluminium content of at least 85.2% by weight, a silicon content of from 11.0 to 13.0% by weight and the remainder up to 100% by weight and at most 1.8% by weight, based on the total weight of the welding material alloy, includes other metals and/or substances.

2. The conductor according to claim 1, wherein the welding material alloy has an aluminium content of at least 92.3% by weight, and a silicon content of from 4.5 to 6.0% by weight and the remainder up to 100% by weight and at most 1.7% by weight, based on the total weight of the welding material alloy, includes other metals and/or substances.

3. The conductor according to claim 1, wherein the lengths of the aluminium conductors have an aluminium content of at least 99.7% by weight and the remainder up to 100% by weight includes other metals and/or substances.

4. The conductor according to claim 1, wherein the other metals or substances in the welding material alloy include one or more of Si, Mn, V, Cu, Ti, Zn, Fe, Be and Mg.

5. The conductor according to claim 1, wherein the other metals or substances in the lengths of the aluminum conductors include one or more of B, Cr, Cu, Fe, Ga, Mn, Si, V, Ti, Zn.

6. The conductor according to claim 1, wherein the welded joint is a v-joint.

7. The conductor according to claim 1, wherein the lengths of the aluminum conductors have a structure of a stranded conductor, a solid conductor, a profile wire conductor or a combination thereof.

8. A power transmission cable including the conductor according to claim 1.

9. The power transmission cable according to claim 8, further including an insulation system that covers the conductor coaxially and radially outwards.

10. A process for the production of a conductor for a power transmission cable according to claim 1 including the steps of:
  a. providing at least two separate lengths of aluminium conductors for a power transmission cable, wherein the aluminium content of the lengths of the aluminium conductors is at least 99.5% by weight, and the remainder up to 100% by weight includes other metals and/or substances, and wherein a titanium content in the remainder is at most 0.02% by weight, based on the total weight of the lengths of the aluminum conductors; and
  b. joining the lengths of the aluminum conductors together by means of welding, wherein the welding is performed by using a welding material alloy having an aluminium content of at least 85.2% by weight, a silicon content of from 11.0 to 13.0% by weight and the remainder up to 100% by weight and at most 1.8% by weight, based on the total weight of the welding material alloy, includes other metals and/or substances;
  wherein the welding is metal inert gas welding or tungsten inert gas welding.

11. The process according to claim 10, wherein the welding joint obtained is a v-joint.

12. The process according to claim 10 including a further step of applying an insulation system to cover the conductor radially outwards.

13. A conductor for a power transmission cable comprising:
  at least two separate lengths of aluminium conductors, wherein the aluminium content of the lengths of the aluminium conductors is at least 99.5% by weight, and the remainder up to 100% by weight includes other metals and/or substances, and wherein a titanium content in the remainder is at most 0.02% by weight, based on the total weight of the lengths of the aluminum conductors,
  the at least two lengths of the aluminium conductors being joined together by means of a welded joint including a welding material alloy, wherein the welding material alloy has an aluminium content of at least 99.5% by weight, a titanium content of from 0.10 to 0.50% by weight and the remainder up to 100% by weight, based on the total weight of the welding material alloy, includes other metals and/or substances.

14. The conductor according to claim 13, wherein the welding material alloy has an aluminium content of at least 99.5% by weight, a titanium content of from 0.10 to 0.20% by weight and the remainder up to 100% by weight includes other metals and/or substances.

15. The conductor according to claim 13, wherein the lengths of the aluminium conductors have an aluminium content of at least 99.7% by weight and the remainder up to 100% by weight includes other metals and/or substances.

16. The conductor according to claim 13, wherein the other metals or substances in the welding material alloy include one or more of Si, Mn, V, Cu, Ti, Zn, Fe, Be and Mg.

17. The conductor according to claim 13, wherein the other metals or substances in the lengths of the aluminum conductors include one or more of B, Cr, Cu, Fe, Ga, Mn, Si, V,Ti, Zn.

18. The conductor according to claim 13, wherein the welded joint is a v-joint.

19. The conductor according to claim 13, wherein the lengths of the aluminum conductors have a structure of a stranded conductor, a solid conductor, a profile wire conductor or a combination thereof.

20. A power transmission cable including the conductor according to claim 13.

21. The power transmission cable according to claim 20, further including an insulation system that covers the conductor coaxially and radially outwards.

22. A process for the production of a conductor for a power transmission cable including the steps of:
   a. providing at least two separate lengths of aluminium conductors for a power transmission cable, wherein the aluminium content of the lengths of the aluminium conductors is at least 99.5% by weight and the remainder up to 100% by weight includes other metals and/or substances and wherein a titanium content in the remainder is at most 0.02% by weight, based on the total weight of the lengths of the aluminum conductors;
   b. joining the lengths of the aluminum conductors together by means of welding, wherein welding is performed by using a welding material alloy having an aluminium content of at least 99.5% by weight, a titanium content of from 0.10 to 0.50% by weight and the remainder up to 100% by weight, based on the total weight of the welding material alloy, includes other metals and/or substances.

23. The process according to claim 22, wherein the welding joint obtained is a v-joint.

24. The process according to claim 22, wherein the welding method is metal inert gas welding or tungsten inert gas welding.

25. The process according to claim 22 including a further step of applying an insulation system to cover the conductor radially outwards.

* * * * *